United States Patent [19]

Takayama et al.

[11] 4,131,326
[45] Dec. 26, 1978

[54] ANTI-SKID BRAKE CONTROL APPARATUS

[75] Inventors: Katsuki Takayama, Chiryu; Masamoto Ando, Aichi, both of Japan

[73] Assignee: Aisin Seiki Kabushiki Kaisha, Aichi, Japan

[21] Appl. No.: 771,570

[22] Filed: Feb. 24, 1977

[30] Foreign Application Priority Data

Mar. 19, 1976 [JP] Japan .................................. 51-30200
Mar. 23, 1976 [JP] Japan .................................. 51-32331
Mar. 23, 1976 [JP] Japan .................................. 51-32332

[51] Int. Cl.² .............................................. B60T 8/14
[52] U.S. Cl. .................................. 303/115; 303/24 R
[58] Field of Search ....................... 188/181 A, 188 R; 303/24 A, 24 B, 24 C, 24 R, 113–115, 117, 119

[56] References Cited

U.S. PATENT DOCUMENTS

| | | | |
|---|---|---|---|
| 3,401,987 | 9/1968 | Horvath | 303/115 |
| 3,721,475 | 3/1973 | Kawase et al. | 303/115 |
| 3,790,228 | 2/1974 | Adaahan | 303/115 |

Primary Examiner—Duane A. Reger
Attorney, Agent, or Firm—Oblon, Fisher, Spivak, McClelland & Maier

[57] ABSTRACT

An anti-skid brake control apparatus is disclosed as including a fluid pressure cut-off valve for opening and closing a fluid circuit between a master cylinder and wheel cylinders in response to a skid sensing signal. The pressure cut-off valve may also utilize a first and second pressure sensing valve arranged in a row, with an acceleration responsive valve and the first pressure sensing valve being arranged in a series.

6 Claims, 10 Drawing Figures

ANTI-SKID BRAKE CONTROL APPARATUS

BACKGROUND OF THE INVENTION

1. Field of the Invention

This invention relates to an improvement in an anti-skid control apparatus.

This invention also relates to a highly improved anti-skid system to vary the wheel cylinders pressure increasing speed in accordance with the road condition during brake pressure re-application. More specifically, the gradual increase of the brake pressure is desirable so as to avoid the wheel locking on a low-$\mu$ road, while on a high-$\mu$ road it is desirable to rapidly increase the brake pressure until reaching a predetermined level and to thereafter gradually increase the brake pressure so as to get sufficient brake force.

In accordance with the invention, it is possible to get the friction coefficient $\mu$ of the road based upon the vehicle deceleration when the anti-skid control is to be applied. That is, when the deceleration is great upon the anti-skid operation the vehicle is presumed to be on a high-$\mu$ road. When the deceleration is small the vehicle is presumed on a low-$\mu$ road. Therefore, the selection of the restriction of operational fluid for the actuator in accordance with the magnitude of vehicle deceleration will result in the rapid increase of brake pressure on a high-$\mu$ road and a gradual increase thereof on a low-$\mu$ road.

In the anti-skid control apparatus of the invention, a valve actuated by sensing a predetermined fluid pressure level during the pressure increasing stage and a valve actuated by sensing a predetermined magnitude vehicle deceleration are arranged in a row within a fluid passage.

2. Description of the Prior Art

In order to vary the pressure increasing speed by the restriction of the operational fluid of an actuator in accordance with the magnitude of vehicle deceleration, it is a conventional practice to provide an electromagnetic valve for the restriction of fluid in the fluid passage. According to such a conventional system, it is necessary to provide a sensor for detecting the vehicle deceleration, electrical lines for setting the change-over point of the electromagnetic valve in accordance with the output of the sensor, and other interrelated structure. Thus, such a conventional system has been found to be costly since the sensor and the electric lines as well as the electromagnetic valve are expensive.

Further, in order to avoid early wheel locking and get a gradual increase of pressure on a low-$\mu$ road, it is necessary to sufficiently restrict the fluid passage. However, when such restriction is effected from the initial stage of brake re-application, the starting time of the brake re-application will be considerably retarded. The time period for pressure decrease is likely to be of considerable length because the retard return of wheel rotation though the piston stroke for pressure decrease may be small in view of the low brake pressure at the starting of pressure decrease, particularly on a low-$\mu$ road. In such a case, the fluid pressure in the actuator is excessively varied and the power piston is also excessively moved. Thus upon brake re-application the excessive movement is, at first to be compensated, so that the compensating time is elongated when the fluid restriction is small and the response to the computer signal for re-pressurizing is reduced. As a result, it is impossible to effectively control the anti-skidding and the stopping distance of the vehicle is unavoidably enlarged due to the retard of brake force application.

In order to overcome these drawbacks it is conventional to employ a solenoid valve for selection of the fluid restriction which may switch-over the rapid pressure increase to the gradual pressure increase and to provide electric circuits for setting the switch-over time based upon the vehicle deceleration by an electric acceleration responsive sensor. However, such conventional apparatus is expensive since the solenoid valve, the acceleration responsive sensor and the electric circuits are expensive per se.

SUMMARY OF THE INVENTION

The object of the present invention is to provide an anti-skid control apparatus in which a vehicle deceleration sensing valve of simple structure and an operational fluid pressure sensing valve are arranged in series within the fluid passage so as to provide the desirable effect inexpensively.

Accordingly, it is also an object of this invention to provide an anti-skid control apparatus which employs a valve for restricting the fluid flow when the deceleration is below a predetermined value and the wheel cylinder pressure is above a predetermined value.

Another object of the present invention is to provide an anti-skid brake control apparatus wherein first and second pressure sensing valves are arranged in a row and an acceleration responsive valve and the first pressure sensing valve are arranged in a series.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
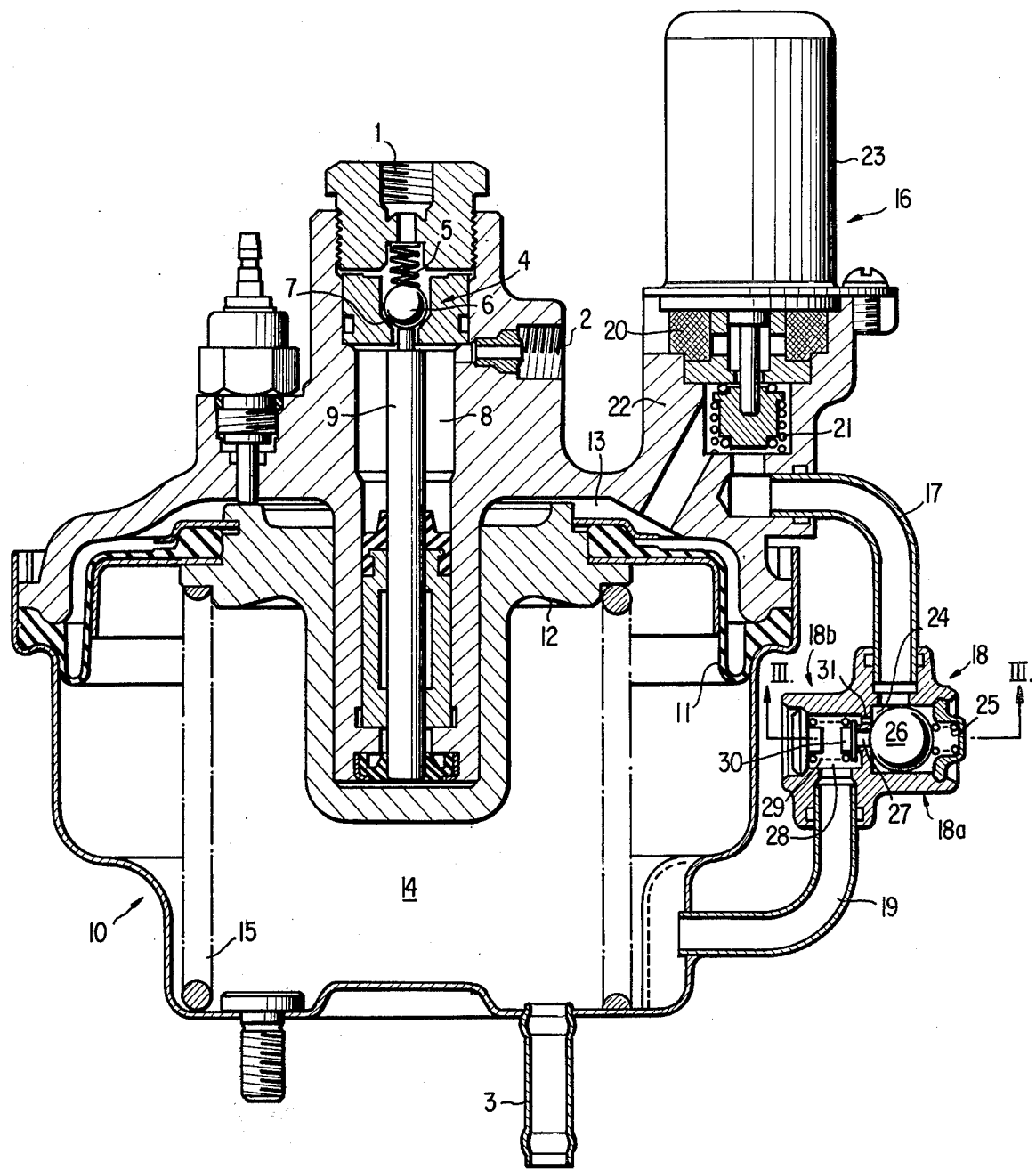
FIG. 1 is a top cross-sectional view of a first embodiment in accordance with the invention, FIGS. 2A, B and C are graphic representations showing the characteristics of the invention.

Referring now to the drawings and more particularly to FIG. 1 wherein a first embodiment of the present invention is illustrated, inlet 1 is provided in a master cylinder which also includes an outlet 2 leading to the wheel cylinders. A cut-off valve 4 of the master cylinder includes a spring 5, a ball 6 and a seat 7.

The capacity of pressure decreasing chamber 8 may be varied due to the movement of piston or plunger 9 thereby controlling the pressure in the wheel cylinders. A servo-motor 10 is therein provided with a port 3 which connects to a vacuum source (e.g. engine intake manifold), a servo-piston 12 supported by a diaphragm 11 to be divided into a first chamber 13 and a second chamber 14. A spring 15 is disposed in second chamber 14 to urge piston 9 upward via servo-piston 12. Thus, the capacity of pressure decreasing chamber 8 is kept to a minimum and the cut-off valve 4 is kept open. An electromagnetic valve 16 for changing over the vacuum and the atmospheric air is connected to chamber 14 via passage 17, valve 18 for controlling the pressure increasing speed, and passage 19. Electromagnetic valve 16 is provided with air inlet 20 and valve chamber 21 connected to first chamber 13 via passage 22. When solenoid 23 is energized due to the signal current from the computer, chamber 13 may be supplied with atmospheric air.

Valve 18 comprises an acceleration responsive valve 18a and pressure sensing valve 18b arranged in series with each other. Chamber 24 of acceleration responsive valve 18a is connected to passage 17 and is therein provided with ball 26 which is urged to more left by spring 25 as shown in FIG. 1. Passage 27 connecting chamber 24 to pressure sensing valve 18b is usually closed by ball 26. When the vehicle is subjected to deceleration above a predetermined value, ball 26 is moved to the right as shown in FIG. 1 to thereby open the passage 27.

Chamber 28 of pressure sensing valve 18b is connected to passage 19 and is therein provided with valve member 30 biased by spring 29. Passage 27 is usually closed by valve 30 but may be opened when the pressure difference of the predetermined value is generated upon valve 30. Passage 31 is arranged between chambers 24 and 28 and is of a smaller size than passage 27.

Figure 3:
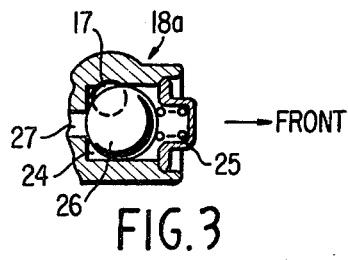
FIG. 3 is a cross-sectional view taken along the line III—III of FIG. 1.

FIG. 3 is a partial cross-section taken along the line III—III of FIG. 1, with the vehicle being advanced in the direction indicated by the arrow.

Figure 4:
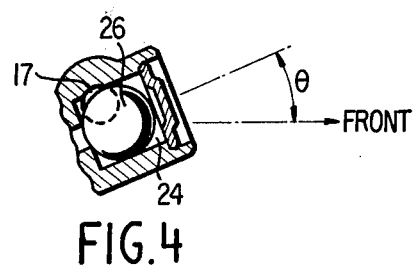
FIG. 4 is a view similar to FIG. 3 but showing another embodiment of the G valve.

FIG. 4 shows a modification of the acceleration responsive valve as illustrated in FIG. 3 wherein the axis of the valve is inclined in place of spring 25 so as to detect the vehicle deceleration.

Figure 5:
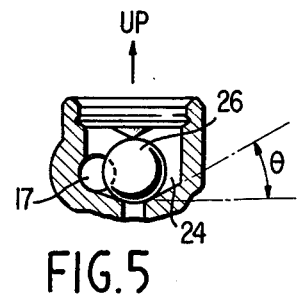
FIG. 5 is a view similar to FIG. 3 but showing a further embodiment of the G valve.

FIG. 5 is another modification of the acceleration responsive valve of FIG. 3 wherein the frustum surface is of the inclination $\theta$ to detect the deceleration.

Figure 6:
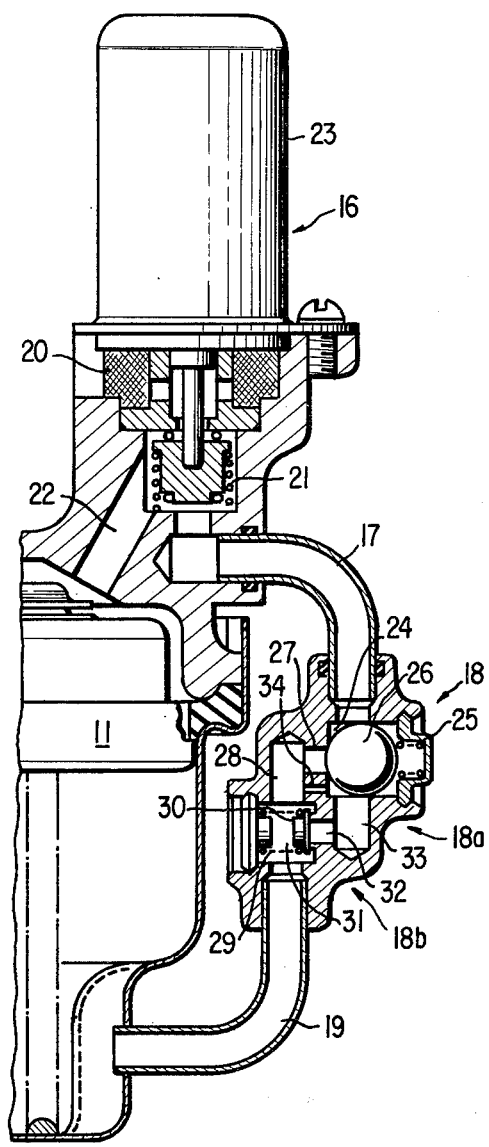
FIGS. 6 and 7 are a partial view of FIG. 3 showing alternate embodiments of the pressure sensing valve.

FIG. 6 shows a modified embodiment of valve 18 as shown in FIG. 3. Upon braking on a low-$\mu$ road, the vehicle deceleration is small and the inertia force of ball 26 is smaller than the exerting force of spring 25. Thus ball 26 is kept in the illustrated position and passage 27 is kept open. In addition, the pressure difference between chambers 13 and 14 is large at the initial stage of re-pressurizing process so that valve 31 of pressure sensing valve 18b is opened to rapidly increase the pressure through large passage 33 as indicated by line 201 of FIG. 2B. When the pressure is increased to the predetermined level the pressure difference therebetween is small to close valve 18b. Therefore, the pressure increasing speed is gradual through the small passage 34 as indicated by line 202 of FIG. 2B.

Upon braking on a high-$\mu$ road, the vehicle deceleration is great and acceleration responsive valve 18 is moved to open passage 27. Thus, the pressure increasing speed is rapid irrespective of movement of pressure sensing valve 18b as shown by line 203 of FIG. 2B.

Figure 7:
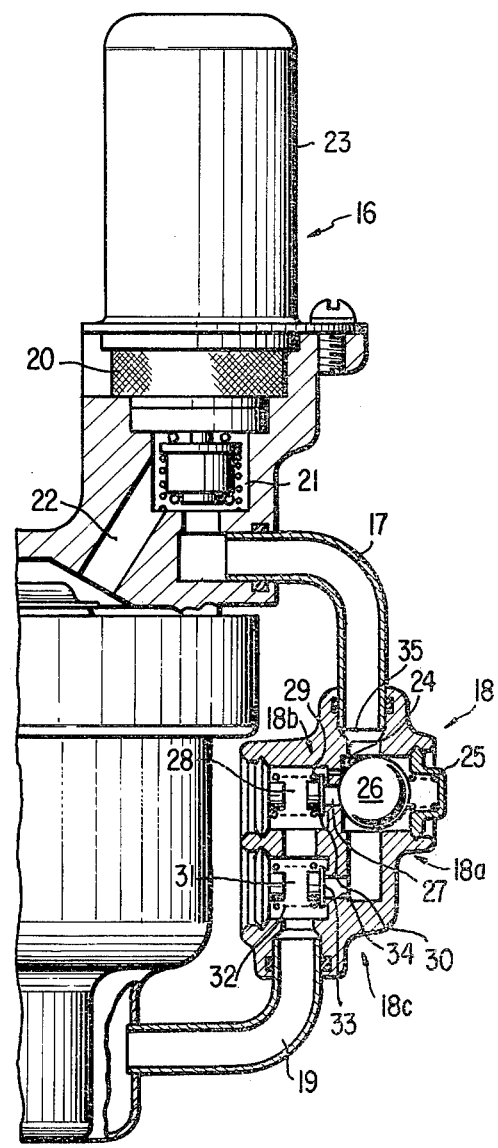

FIG. 7 shows another embodiment of valve 18 as shown in FIG. 3. Valve 18 includes a first pressure sensing valve 18b, a second pressure sensing valve 18c arranged in a row therewith, and an acceleration responsive valve 18a arranged in a series with the first pressure sensing valve 18b. A valve chamber 24 of an acceleration responsive valve 18a is connected to passage 17 and includes therein ball 26 biased to be left by spring 25. An opening 27 between the chamber 24 and the valve 18b is usually closed by the ball 26. When the vehicle generates deceleration above a predetermined value, ball 26 is moved right to release the closure of opening 27. Such predetermined value may be set in accordance with the exerting force of spring 25 and the weight of ball 26. A valve chamber 28 of first pressure sensing valve 18b is connected to passage 19 and includes therein valve 30 biased by spring 29. The end of opening 27 is usually closed by valve 30 and is opened when the pressure difference on valve 30 gets above a first predetermined value set by the exerting force of spring 29 and the effective area of valve 30. A valve chamber 31 of second pressure sensing valve 81c is connected to passage 19 and includes therein valve 33 biased by spring 32. An opening 34 communicable with passage 17 is usually closed by valve 33 and is opened when the pressure differences on valve 33 gets above a second predetermined value set by spring 32 and the effective area of valve 33. The second predetermined value is set higher than the first predetermined value. Passage 35 is arranged between passages 17 and 19 and is made smaller than openings 27 and 34 while 36 denotes a warning device.

Figure 8:
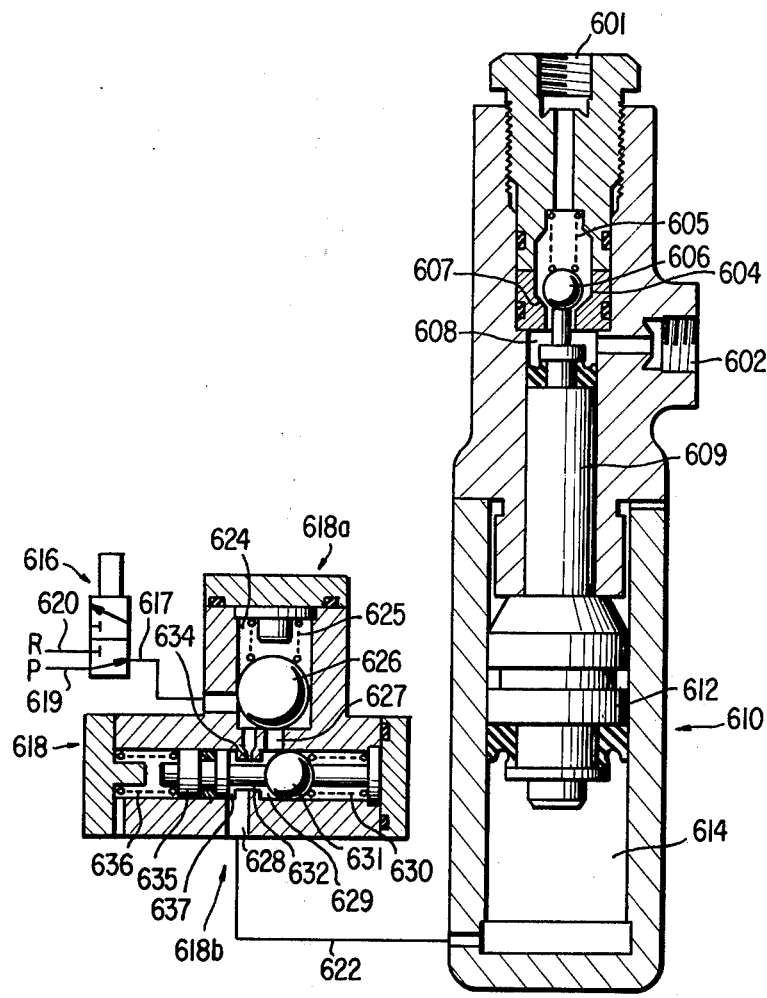
FIG. 8 is a cross-section of a second embodiment of the invention.

FIG. 8 shows an embodiment wherein the oil pressure of pump P for the power steering gear or similar structure is utilized as operational pressure. Conduit 619 is connected to pump P and conduit 620 is connected to reservoir R. The pressure in power chamber 614 is drained to reservoir R through conduit 620 due to the operation of an electromagnetic valve 616, thereby moving piston 609 to reduce the brake pressure. When electromagnetic valve 616 is returned the pump oil pressure is admitted to conduit 622 from conduit 619 via valve 616, conduit 617 and valve 618, thus re-establishing the brake pressure. Passage 632 is closed when the pressure in chamber 637, (i.e., in chamber 614) is above a predetermined value set by spring 636 and piston 635.

Therefore, pressure sensing valve 618b of valve 618 is opened at the initial stage of the brake re-application to provide a large passage of oil. After an increase above the predetermined value, valve 618b is closed to provide the restricted flow. Acceleration responsive valve 618a provides a rapid increase of pressure when the deceleration is great and the brake pressure is below the predetermined value.

In operation in accordance with the embodiment of FIG. 1, when the brake is applied in the usual way, the fluid pressure in the master cylinder is admitted to the wheel cylinders through cut-off valve 4 and pressure decreasing chamber 8 thus generating the brake force.

In the event of wheel locking due to sudden braking on a slippery road, electromagnetic valve 16 is actuated by the signal current of the anti-skid computer. Thus, passage 22 connected to chamber 13 is isolated from passage 17 and is connected to air inlet 20 thereby admitting atmospheric air to chamber 13. Chamber 14 is at this time being supplied with vacuum via port 3 so that servo-piston 12 is moved down against spring 15 due to the pressure differential. Piston 9 is also moved down due to the fluid pressure in chamber 8. Consequently, cut-off valve 4 is closed to increase the capacity of chamber 8 and decrease the wheel cylinder pressure.

The wheel locking or the likelihood thereof may thus be avoided.

Subsequently, the computer regenerates the signal current to return electromagnetic valve 16 to the original position as shown. Atmospheric air passage 22 is closed and chamber 13 is connected to vacuum chamber 14 via valve 18, thereby decreasing the pressure difference on servo-piston 12. Piston 9 as well as servo piston 12 are pushed back by spring 15 to decrease the capacity of chamber 8, so that cut-off valve 4 is opened to connect the master cylinder to the wheel cylinders. At this point the air flow from chamber 13 to chamber 14 is controlled by valve 18 as will be hereinafter apparent.

The vehicle deceleration is small on a low-μ road, so that the inertia force on ball 26 is small and acceleration responsive valve 18a is not actuated. Therefore, the air flow from chamber 13 to chamber 14 is restricted by passage 31 as seen by line 201 of FIG. 2A.

The vehicle deceleration is great on a high-μ road, so that the inertia force on ball 26 is great and G valve 18a is actuated to open. The valve 30 of pressure sensing valve 18b has applied thereto the pressure difference between chambers 24 and 28. This pressure difference is kept larger than the predetermined value until the brake pressure is increased up to the predetermined level, so that pressure sensing valve 18b is operated to open passage 27. Accordingly, the air flow passes the larger passage 27 as indicated by line 202 of FIG. 2A. When the brake pressure reaches the predetermined value to decrease the pneumatic pressure difference, pressure sensing valve 18b is closed so that the air flow passes only through passage 31 irrespective of the operation of acceleration responsive valve 18a. The brake pressure re-applying speed is thus slow as indicated by line 203 of FIG. 2A.

When the coefficient of friction of the road is high during the pressure increase operation, the vacuum in chamber 13 is communicated to chamber 14 through passage 22, valve 16, chamber 26, acceleration responsive valve 18a passage 27, valve 18b, chamber 28 and passage 19.

Figure 2A:
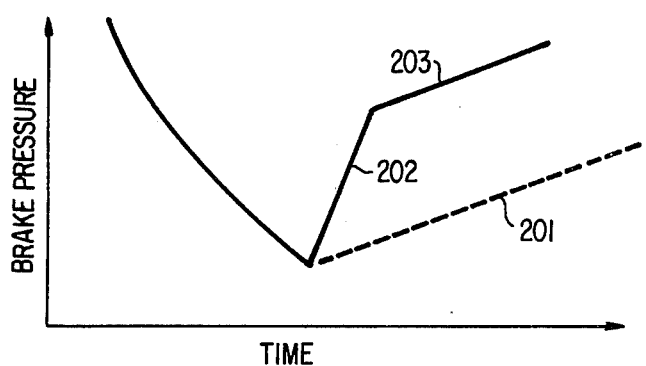
Figure 2B:
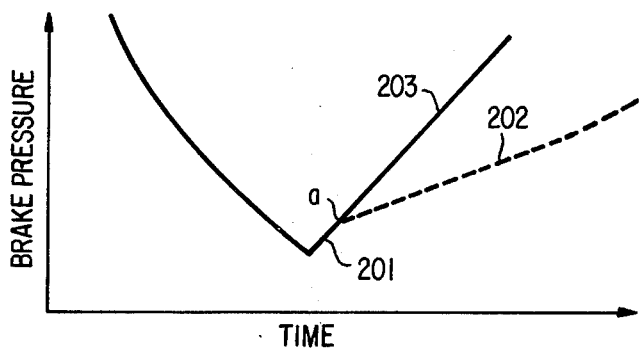
Figure 2C:
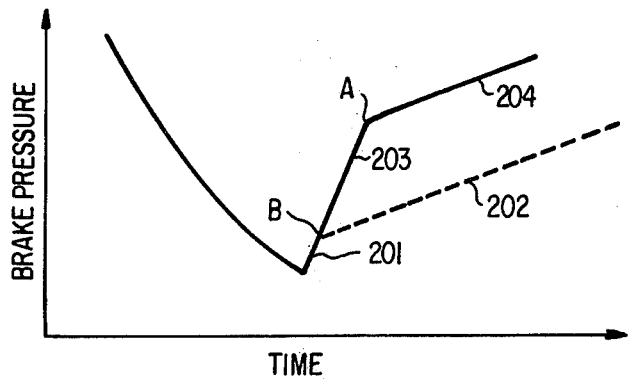

First, at the initial pressure increase stage as shown in FIGS. 2A-2C, the pressure sensing valve 18b is closed. At the next stage, the pressure sensing valve 18b will open due to the open communications between chambers 26 and 13 and chambers 28 and 24. Thus, chamber 24 communicates with chamber 28 through passage 27, and further, since the chamber 24 always communicates with the chamber 28 through open passage 31, the size of the restriction orifice becomes larger to reduce the pressure difference between chambers 26 and 28.

However, since the chambers 24 and 13 as well as chambers 28 and 14 are in communication with each other without having any restriction orifices therebetween, the pressure difference between chambers 24 and 28 corresponds to the difference between chambers 14 and 13, which will cause the pressure increase speed to be higher.

Even so, the air pressure supplied to the chamber 24 is gradually reduced, and therefore, the pressure difference between chambers 24 and 28 is reduced accordingly. Then the pressure sensing valve 18b is closed by the force of the spring 29 acting on valve 30 and the air is introduced only through the passage 31 to reduce the orifice effect.

In this manner, the valve opening pressure $P_c$ of the pressure sensing valve 18b is represented as $$P_c = f/s$$

$f$ = force of spring 29
$s$ = effective cross-sectional area of passage 27

Thus, the "Pc" can be easily determined by predetermining the force of spring 29 and the cross-sectional area of the passage 27.

In the operation of the normal brake application in the embodiment as shown in FIG. 7, the fluid pressure in the master cylinder is applied to the wheel cylinders via cut-off valve 4 and pressure decreasing chamber 8 to generate the brake force.

In the event of the wheel locking or the likelihood thereof due to the sudden braking on a slippery road, electromagnetic valve 16 is actuated by the current signal of the computer. Passage 22 connecting with chamber 13 is thus isolated from passage 17 and is connected to air inlet 20, thereby admitting the atmospheric air into chamber 13. Chamber 14 is at this time being connected to the vacuum source via port 3. As a result, servo piston 12 is moved down against spring 15. Piston 9 is also moved down due to the fluidic pressure in chamber 8 so as to close cut-off valve 4. Therefore, the capacity of chamber 8 is increased and the wheel cylinders pressure is decreased thereby avoiding the possibility of wheel locking. Subsequently, the computer releases the signal to return electromagnetic valve 16 to the illustrated position.

Chamber 13 is connected to vacuum chamber 14 via valve 18 to return servo piston 12 by decreasing the pressure difference thereon and in turn, return piston 9, thereby decreasing the capacity of chamber 8. The wheel cylinders pressure is thus recovered and cut-off valve 4 is opened to connect the master cylinder with the wheel cylinders.

In such a pressure increasing process, the air flow from chamber 13 to chamber 14 is controlled by valve 18. The vehicle deceleration is small on a low-μ road and the inertia force of ball 26 is also small. Thus, acceleration responsive valve 18a is not actuated and opening 27 is maintained closed as shown in FIG. 7. At the initial stage of the pressure increasing process, the pressure difference between chambers 13 and 14 is great and so the pressure difference on valve 33 is larger than the second predetermined value. Consequently, second pressure sensing valve 18c is opened to rapidly increase the pressure via large passage 34 as indicated by line 201 of FIG. 2C. When the pressure difference is below the second predetermined value, passage 34 is closed by valve 33 and the pressure is gradually increased via small passage 35 as indicated by line 202 of FIG. 2C.

On a high-μ road, the vehicle deceleration is great and the inertia force of ball 26 is also great and acceleration responsive valve 18a is thus actuated to open passage 27. While the pressure difference between chambers 13 and 14 is large, valve 30 of first pressure sensing valve 18b is opened to rapidly increase the pressure via large passage 27 as indicated by line 203 of FIG. 2C. When the pressure difference gets below the first predetermined value passage 27 is closed by valve 30. Second valve 18c is at this time being closed since the first predetermined value is smaller than the second predetermined value. Therefore, the pressure increase speed is gradual via small passage 35 as indicated by line 204 of FIG. 2C.

The deflecting points A and B of FIG. 2C are determined respectively by the first and the second predetermined values. It is preferable to set point A lower than the pressure causing the wheel locking on a high-$\mu$ road and to set point B lower than the pressure causing the wheel locking on a low-$\mu$ road.

As will be apparent from the previous description, the vehicle deceleration sensing valve and the fluid pressure sensing valve are of a simple structure and are arranged in a series according to the present invention. Therefore, the brake re-applying pressure is slowly increased to avoid the wheel locking on a low-$\mu$ road whereas the brake re-applying pressure is rapidly increased to get the sufficient braking force but slowly increased above the predetermined value on a high-$\mu$ road. As a result, the stopping distance of the vehicle upon braking may be shortened and the anti-skid apparatus may be inexpensively realized.

According to the present invention as described above, the pressure increasing speed may be selected in accordance with the road condition so as to get an effective anti-skid control. On a low-$\mu$ road, the pressure increasing speed may be gradual so that an effective and inexpensive anti-skid control apparatus with a short stopping distance may be provided.

Also, according to the present invention, two separate pressure sensing valves of differing closing pressure are arranged in a row with one another wherein the pressure sensing valve of the lower closing pressure is arranged in a series with acceleration responsive valve. Therefore, the wheel cylinders pressure is rapidly increased at the initial stage of the process to recover the brake force and is gradually increased thereafter to avoid the wheel locking.

In addition, the rapid increase of the pressure may thus be changed to a gradual increase thereof in accordance with the friction coefficient of the road so that an inexpensive and responsive anti-skid brake control apparatus utilizing the frictional resistance of the road can be provided in accordance with the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An anti-skid brake control apparatus for a vehicle including a fluid pressure cut-off valve for opening or closing a fluid pressure conduit between a master cylinder and wheel cylinders in response to a skid sensing signal, comprising:
    a plunger adjacent said cut-off valve for reducing or increasing said wheel cylinders pressure by controlling the capacity of said fluid pressure conduit between said cut-off valve and said wheel cylinders,
    a servo-device adjacent said plunger having first and second chambers divided by a servo-piston, said servo-piston being adapted for moving said plunger by means of operational fluid pressure,
    a change-over valve interconnecting said first and second chambers for admitting or draining said operational fluid to or from one of said first and second chambers in response to said skid sensing signal,
    a pressure sensing valve positioned between said servo-device and said change-over valve adapted to be closed when the pressure difference between said first and second chambers reaches a predetermined value during a pressure re-applying stage after decreasing said wheel cylinders pressure and
    an acceleration responsive valve connected by a passage member with said sensing valve so as to be opened when said vehicle is decelerated above a predetermined value including a ball disposed within a connecting chamber, and a by-pass passage interconnecting said pressure sensing valve and said acceleration responsive valve connecting chamber, said pressure sensing valve and said acceleration responsive valve being arranged in a series within a fluid pressure passage.

2. An anti-skid brake control apparatus for a vehicle including a fluid pressure cut-off valve for opening and closing a fluid circuit between a master cylinder and wheel cylinders in response to a signal of a skid sensing computer, comprising:
    means adjacent said cut-off valve for varying the capacity of a fluid circuit between said cut-off valve and said wheel cylinders to control the fluidic pressure at the side of said wheel cylinders,
    a servo-device adjacent said means having first and second chambers divided by a servo-piston operable by a fluid pressure difference between said first and second chambers for actuating said means,
    a change-over valve interconnecting said first and second chambers admitting said fluid to or draining said fluid from said first chamber of said servo-device in response to a signal of said computer,
    a first valve positioned between said servo-device and said change-over valve adapted to close when the pressure difference between said first and second chambers of said servo-device is below a first predetermined value during a pressure re-applying process,
    a second valve connected to said first valve adapted to close when the pressure difference is below a second predetermined value which is higher than said first predetermined value, and
    an acceleration responsive valve adjacent said first and second valves adapted to open when said vehicle is decelerated above a predetermined value, including a small passage for by-passing said first and said second valves from said acceleration responsive valve, said first and said second valves being arranged in a row with each other and said acceleration responsive valve being arranged in a series with said first valve within a flow passage.

3. An anti-skid brake control apparatus as set forth in claim 1 which further comprises:
    means for biasing said ball so as to close said passage.

4. An anti-skid brake control apparatus as set forth in claim 3, wherein;
    said biasing means is disposed between said ball and said chamber on a side of said ball opposite to said pressure sensing valve.

5. An anti-skid brake control apparatus as set forth in claim 3, wherein:
    said biasing means comprises inclining the axis of said acceleration responsive valve.

6. An anti-skid brake control apparatus as set forth in claim 3, wherein:
    said biasing means comprises a frustum surface upon which said ball is disposed.

* * * * *